United States Patent
Park et al.

(10) Patent No.: US 7,573,558 B2
(45) Date of Patent: Aug. 11, 2009

(54) SUPPORT UNIT UTILIZED IN VISUAL INSPECTION OF DISPLAY SUBSTRATE

(75) Inventors: Sang-Ho Park, Busan (KR); Jang-Hun O, Dae-gu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/232,317

(22) Filed: Sep. 15, 2008

(65) Prior Publication Data

US 2009/0015827 A1    Jan. 15, 2009

Related U.S. Application Data

(62) Division of application No. 11/022,946, filed on Dec. 28, 2004, now Pat. No. 7,440,072.

(30) Foreign Application Priority Data

Dec. 30, 2003    (KR) .................... 10-2003-0100326

(51) Int. Cl.
  *G02F 1/1333*  (2006.01)
  *G02F 1/1339*  (2006.01)
  *G02F 1/13*    (2006.01)
(52) U.S. Cl. ............... 349/158; 349/153; 349/154; 349/187; 349/159; 349/190
(58) Field of Classification Search ......... 349/153–154, 349/158, 187, 189–190
See application file for complete search history.

(56) References Cited

U.S. PATENT DOCUMENTS

| 6,870,594 | B1 * | 3/2005 | Zhang | 349/187 |
| 7,255,147 | B2 * | 8/2007 | Lee et al. | 156/382 |
| 2004/0263768 | A1 * | 12/2004 | Lee et al. | 349/158 |

\* cited by examiner

*Primary Examiner*—David Nelms
*Assistant Examiner*—Hoan C Nguyen
(74) *Attorney, Agent, or Firm*—McKenna Long & Aldridge LLP

(57) ABSTRACT

Disclosed is a support unit for visually inspecting a display substrate, such as an LCD device, that enhances accuracy of the inspection by supporting the display substrate at dummy regions between cell areas. The support unit includes fixed bars disposed apart from each other and along a first direction; a plurality of support bars connected to the fixed bars, the support bars oriented along a second direction crossing the first direction and movable along the first direction; a guide bar mounted on at least one of the support bars, the guide bar oriented along the first direction and movable along the second direction; first and second auxiliary support bars connected to the guide bar, the auxiliary support bars oriented along the second direction and movable along the first direction; and a plurality of supporting means disposed on the support bars and the auxiliary support bars.

6 Claims, 3 Drawing Sheets

SUPPORT UNIT UTILIZED IN VISUAL INSPECTION OF DISPLAY SUBSTRATE

CROSS-REFERENCE TO RELATED APPLICATIONS

This application is a Divisional of application Ser. No. 11/022,946, filed Dec. 28, 2004, now U.S. Pat. No. 7,440,072; which claims priority to Korean Patent Application No. 10-2003-0100326, filed Dec. 30, 2003, all of which are hereby incorporated by reference as if fully set forth herein.

This application claims the benefit of Korean Patent Application No. 2003-100326, filed on Dec. 30, 2003, which is hereby incorporated by reference for all purposes as if fully set forth herein.

BACKGROUND OF THE INVENTION

1. Field of the Invention

The present invention generally relates to a support unit that is utilized in a visual inspection of display substrates. More particularly, the present invention relates to a support unit that can effectively support a display substrate having various size cell regions in the visual inspection.

2. Discussion of the Related Art

A display substrate refers to a display device having a transparent base substrate such as a glass. A liquid crystal display (LCD) device is an example of a typical display device.

An LCD device includes an array substrate having a thin film transistor (TFT), a color filter substrate having a color filter layer, and a liquid crystal layer that is interposed between the array substrate and the color filter substrate. An LCD device is formed through processes including an array process for forming the array substrate, a color filter process for forming the color filter substrate, a cell process for interposing the liquid crystal layer between the array substrate and the color filter substrate, and a module process that includes a step of attaching polarizers on outer sides of the array substrate and the color filter substrate.

Thin film patterns are formed in the array and color filter processes through depositing (or coating), photolithography including exposing and developing, and etching procedures. In addition, the cell process includes forming an alignment layer on the inner surface of each of the array substrate and the color filter substrate; rubbing the alignment layer; scattering a spacer on either the array substrate or the color filter substrate; attaching the array substrate and the color filter substrate; and interposing the liquid crystal layer by, for example, injecting the liquid crystal material between the array substrate and the color filter substrate. The array substrate, the color filter substrate, and the liquid crystal layer form an LCD panel. Moreover, the module process includes a final step in which production quality of the LCD panel is determined by inspection, polarizers are attached to the LCD panel, various circuitry is integrated with the LCD panel, and the backlight is installed.

A visual inspection of the LCD panel is performed after the cell process and before the module process. Through the visual inspection process, spots or particles that are found due to a spacer defect can be removed. The visual inspection includes preparing a support unit, disposing the LCD panel on the support unit, and setting the support unit to support the LCD panel. The visual inspection further includes radiating inspection light into the LCD panel and measuring a uniformity of inspection light that is transmitted into the LCD cell. Specifically, the LCD panel for inspecting may include polarizers on outer sides of the LCD panel. Visual inspection may be performed on the stand-alone LCD panel, or on a display substrate including the LCD panel.

FIG. 1 is a schematic perspective view of a support unit utilized in a visual inspection of a display substrate according to the related art. The display substrate (not shown) includes a transparent base substrate such as a glass.

In FIG. 1, first and second fixed bars 10 and 12 are disposed apart from each other and are oriented along a first direction. A plurality of support bars 14 are connected to both of the first and second fixed bars 10 and 12 and are oriented along a second direction crossing the first direction. The plurality of support bars 14 are movable along the first direction. In addition, a plurality of supporting means 16 that directly contact a display substrate (not shown), or the object of the visual inspection, are mounted on the plurality of the support bars 14.

FIG. 2 is a schematic plan view illustrating a support structure of FIG. 1 supporting a multi-model type display substrate according to the related art. The multi-model type display substrate may be defined as a display substrate that has multiple cell areas arranged on it for increasing space efficiency.

In FIG. 2, a display substrate 20 has a plurality of first cells 22 having a first active area AA1 and a plurality of second cells 24 having a second active area AA2 smaller than the first active area AA1. The second cells 24 may be formed to reduce a dummy region DR between the first cells 22. That is, the display substrate 20 includes first cells 22, second cells 24 and dummy region DR.

To effectively support the display substrate 20 by the support unit 18 before the visual inspection, the support bars 14 of the support unit 18 should be moved to be corresponded to the dummy region DR of the display substrate 20.

Accuracy of the visual inspection is degraded by any shielding or blocking of inspection light by the support bars 14 or the supporting means 16. This generally occurs if the support bars 14 and the supporting means 16 overlap with the active areas AA1 and AA2 of the first or second cells 22 and 24 as shown in region OP of FIG. 2. However, because the support bars 14 of the support unit 18 according to the related art move by a simple rectilinear movement, small size active areas such as the second active areas AA2 of the display substrate inevitably overlap with a portion of the support bars 14.

Therefore, there is a problem in that the visual inspection cannot be accurate because the inspection light is shielded where the support bars 14 and the supporting means 16 overlap the active areas.

SUMMARY OF THE INVENTION

Accordingly, the present invention is directed to a support unit that is utilized in a visual inspection of a display substrate that substantially obviates one or more of the problems due to limitations and disadvantages of the related art.

An advantage of the present invention is to provide a display device that has improved quality because of a more accurate inspection due to mitigation of light shielding during inspection.

Another advantage of the present invention is to provide a support unit for inspection of a display device that enables more accurate inspection of the display's active area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a support unit for a display substrate, comprises first and second fixed bars disposed apart from each other and oriented along a first direction; a plurality of support bars connected to both of the first and second fixed bars, the plurality of support bars oriented along a second direction crossing the first direction and movable along the first direction; a guide bar disposed on at least one of the plurality of the support bars, the guide bar oriented along the first direction and movable along the second direction; first and second auxiliary support bars connected to the guide bar, the first and second auxiliary support bars oriented along the second direction and movable along the first direction; and a plurality of supporting means disposed on the plurality of the support bars and the first and second auxiliary support bars.

In another aspect of the present invention, a method of inspecting a display substrate using a support unit, the display substrate having a plurality of first cells having a first active area, at least one first dummy region between the first cells, a plurality of second cells having a second active area smaller than the first active area, a second dummy region between the first and second cells, and a plurality of third dummy regions between the second cells; the support unit having a support bar, a guide bar disposed on the support bar, a first and second auxiliary support bar connected to the guide bar, and supporting means disposed on the support bar and the first and second auxiliary support bar, the method comprises disposing the display substrate on a plurality of supporting means; aligning the support bar with one of the at least one first dummy region; aligning the guide bar with the second dummy region; and aligning the first and second auxiliary support bar with two of the plurality of third dummy regions.

In another aspect of the present invention, a method of preparing a display substrate for visual inspection on a support unit, the display substrate having a plurality of first cells having a first active area, at least one first dummy region between the first cells, a plurality of second cells having a second active area smaller than the first active area, a second dummy region between the first and second cells, and a plurality of third dummy regions between the second cells; the support unit having a support bar, a guide bar disposed on the support bar, a first and second auxiliary support bar connected to the guide bar, and supporting means disposed on the support bar and the first and second auxiliary support bar, the method comprises disposing the display substrate on a plurality of supporting means; aligning the support bar with one of the at least one first dummy region; aligning the guide bar with the second dummy region; and aligning the first and second auxiliary support bar with two of the plurality of third dummy regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to an embodiment of the present invention, example of which is illustrated in the accompanying drawings.

Figure 1:
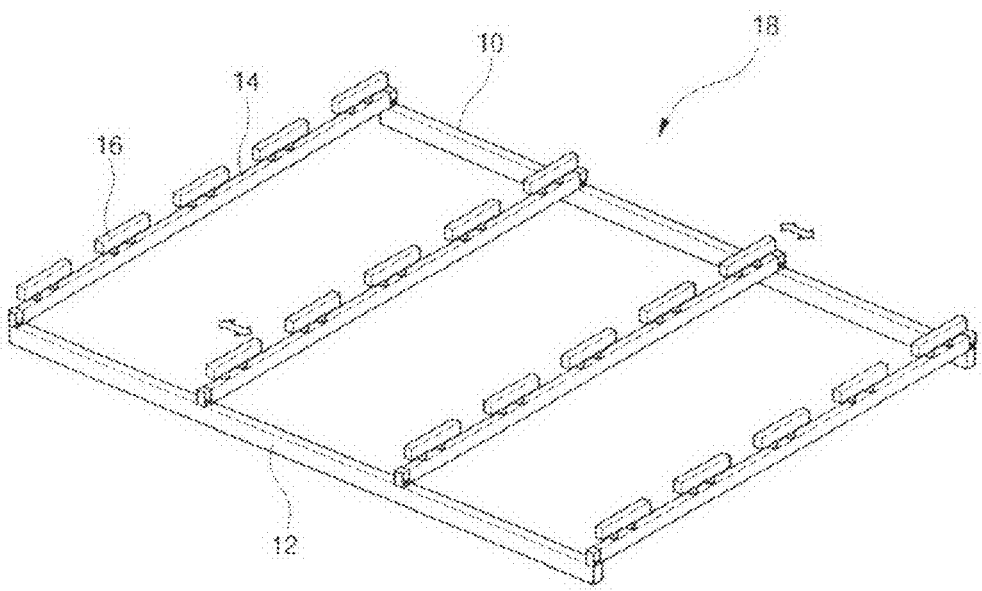
FIG. 1 is a schematic perspective view of a support unit utilized in a visual inspection of a display substrate according to the related art.
Figure 2:
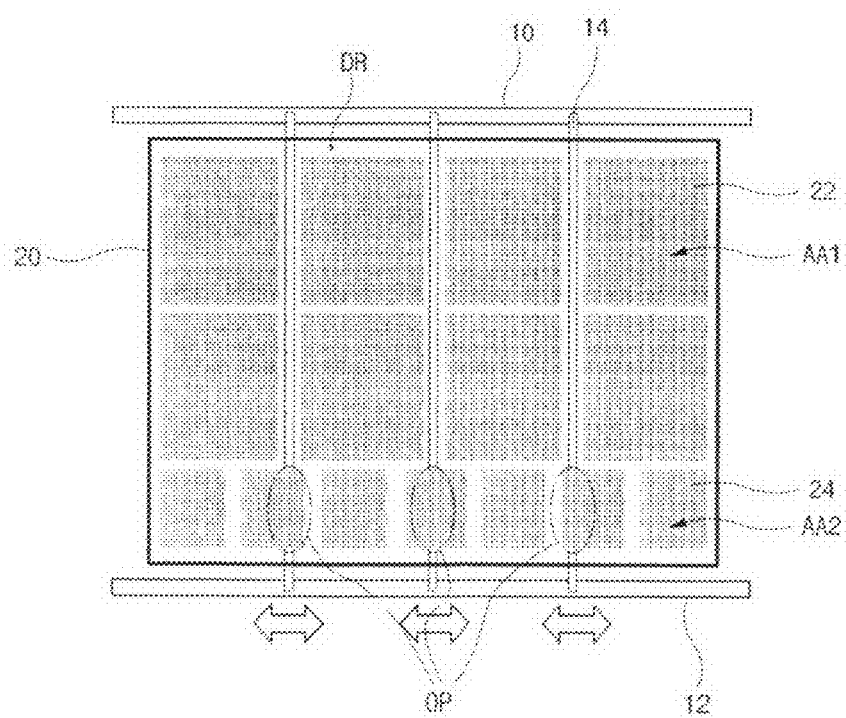
FIG. 2 is a schematic plan view showing a support unit according to the related art supporting a multi-model type display substrate.
Figure 3:
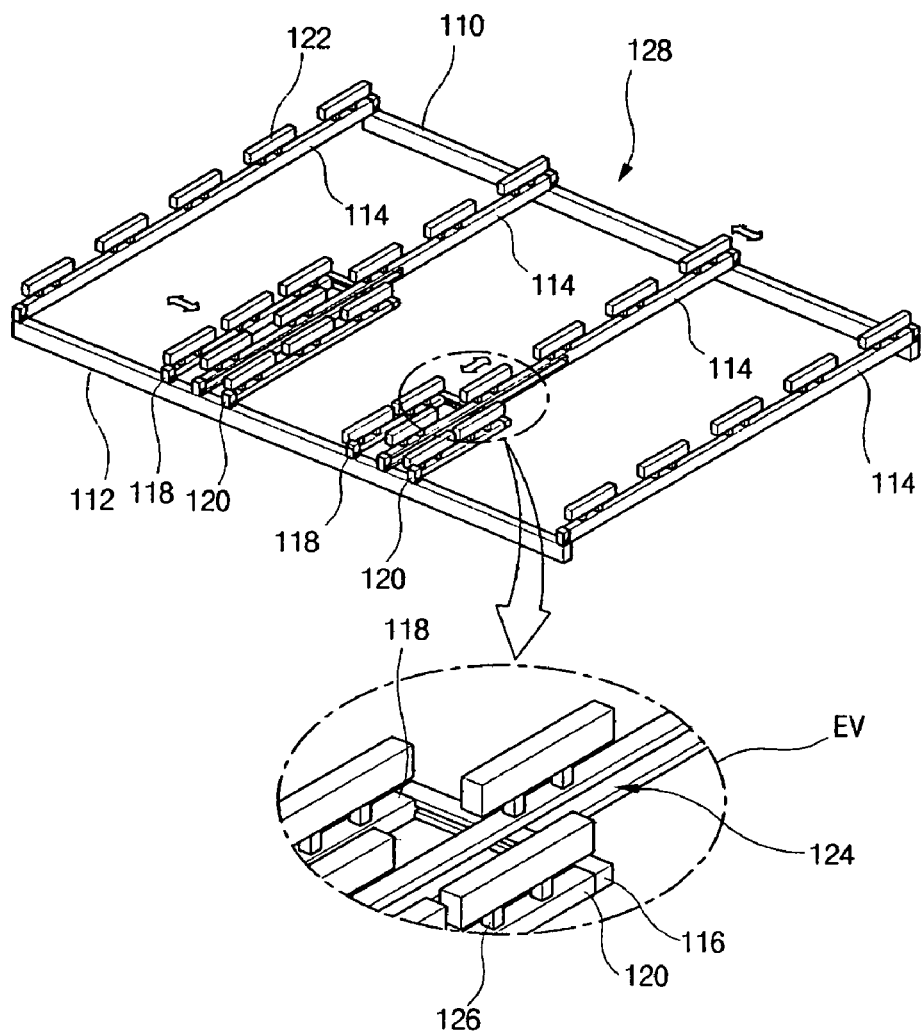
FIG. 3 is a perspective view of a support unit utilized in a visual inspection of a multi-model type display substrate according to the present invention.
Figure 4:
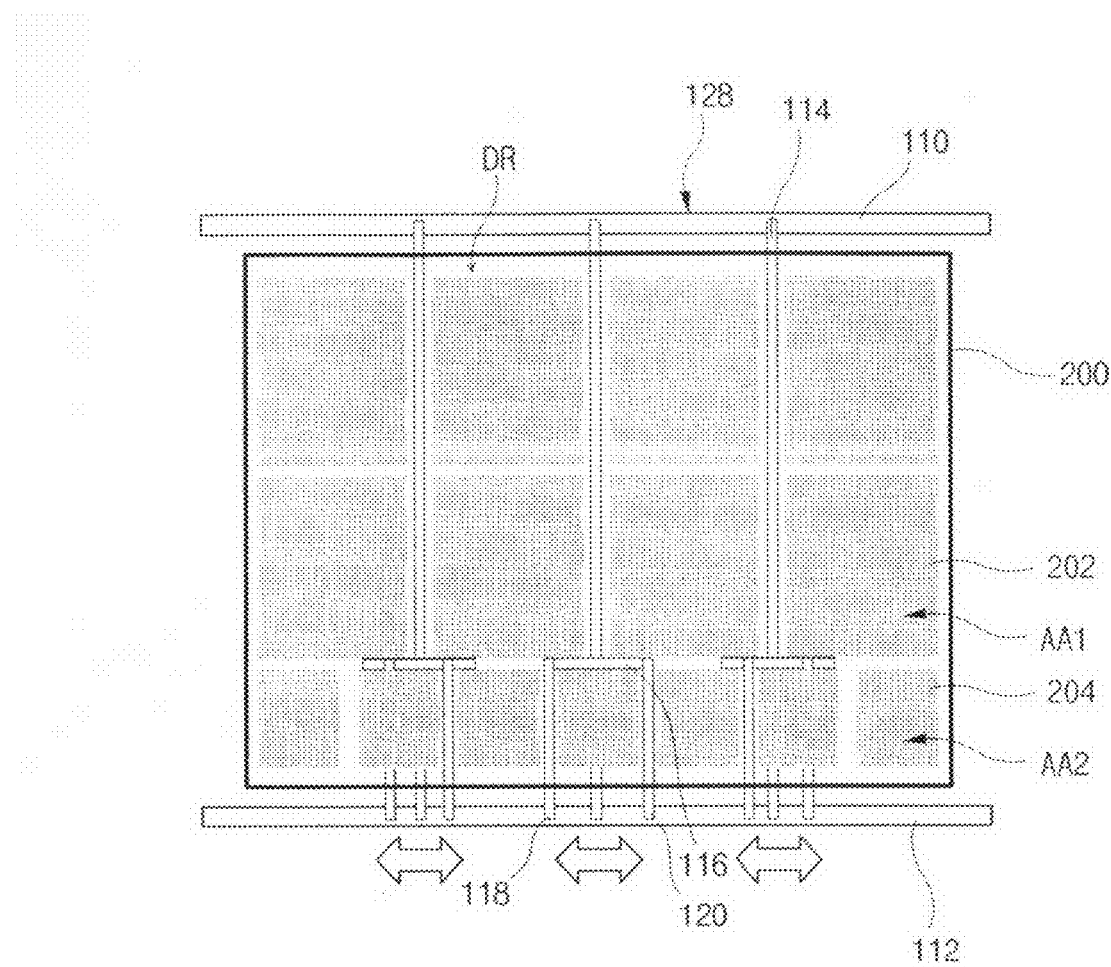
FIG. 4 is a plan view illustrating a support unit according to the present invention supporting a multi-model type display substrate.
Figure 5:
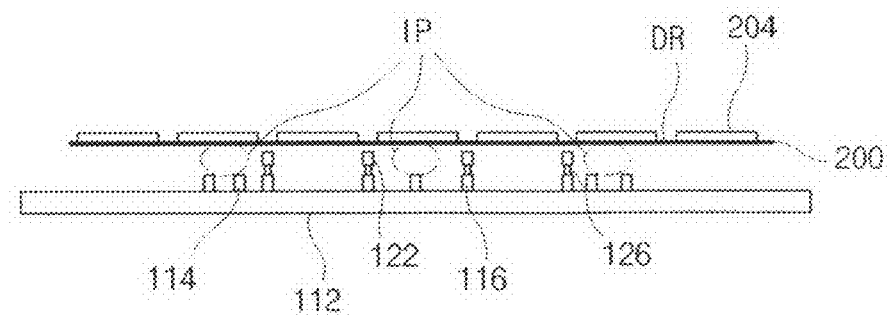
FIG. 5 is a cross sectional view illustrating a support unit according to the present invention supporting a multi-model type display substrate.

FIGS. 3, 4, and 5 illustrate a support unit 128 utilized in a visual inspection of a multi-model type display substrate 200 according to the present invention. FIG. 3 is a perspective view for the support unit 128, FIG. 4 is a plan view illustrating a support unit 128 supporting a multi-model type display substrate 200 by the support unit, and FIG. 5 is a cross sectional view showing a support unit 128 supporting a multi-model type display substrate 200.

As illustrated in FIG. 3, first and second fixed bars 110 and 112 are disposed apart from each other and are oriented along a first direction. A plurality of support bars 114 are connected to both of the first and second fixed bars 110 and 112, and they are oriented along a second direction crossing the first direction. Each of the plurality of support bars 114 are independently movable along the first direction. In addition, a guide bar 116 is mounted on at least one of the plurality of the support bars 114 and is oriented substantially along the first direction. The guide bar 116 is movable along the second direction.

First and second auxiliary support bars 118 and 120 are connected to the guide bar 116 and are oriented along the second direction. The first and second auxiliary support bars 118 and 120 are independently movable along the first direction by a distance whose limit is in part due to the length of the guide bar 116. Moreover, a plurality of supporting means 122 is mounted on the plurality of the support bars 114 and the first and second auxiliary support bars 120. The plurality of supporting means 122 may directly support a display substrate (not shown).

As illustrated in region EV, the support bars 114 having the guide bar 116 thereon has a slot 124, or sliding hole, which functions as a moving channel for the guide bar 116 that engages the slot 124. That is, the slot 124 is oriented along the second direction and the guide bar 116 can move along that direction by passing through the slot 124. In addition, each of the first and second auxiliary support bars 118 and 120 may have a variable length corresponding to the position of the guide bar 116 along the second direction. The first and second auxiliary support bars 118 and 120 have first and second end portions, respectively. The first end portions of the first and second auxiliary support bars 118 and 120 are respectively connected to the guide bar 116, and the second end portions of the first and second auxiliary support bars 118 and 120 are respectively connected to the second fixed bar 112. In a particular embodiment, the first and second auxiliary support bars 118 and 120 have a separable structure such that the support bars 118 and 120 may be replaced with substantially similar support bars having a different length, as illustrated in FIG. 3. Alternatively, the first and second auxiliary support bars 118 and 120 may be each connected at their respective second end portions by a mount that permits the support bars 118 and 120 to translate along the second direction relative to the second fixed bar 112. Such a mount may enable the first and second support bars 118 and 120 to vary in length according to the position of the guide bar 116 along the second direction. One skilled in the art will readily recognize that many configurations and variations for such a mount are possible and within the scope of the invention.

Moreover, the guide bar 116 and the each of the first and second auxiliary support bars 118 and 120 may be connected whereby the guide bar 116 has a concave feature (not shown) formed in one side, and the support bars 118 and 120 has a complementary convex feature (not shown) formed on the end that interfaces with the guide bar 116. The concave feature may take the shape of a tab, and the convex feature may take the shape of a groove, wherein the tabs at the ends of each of the support bars 118 and 120 may engage the groove in guide bar 116, as illustrated in region EV. With this arrangement, the support bars 118 and 120 may individually translate in the first direction relative to the guide bar 116. It will be apparent to one of ordinary skill that many variations to this feature are possible and within the scope of the invention.

In a particular embodiment, each supporting means 122 within the plurality has a separable structure. Each of the support bars 114 and each of the first and second auxiliary support bars 118 and 120 have an inserting hole (not shown) where the supporting means 122 connects to each of the support bars 114 and each of the first and second auxiliary support bars 118 and 120. Moreover, a connection means 126 is located between each of the supporting means 122 and the inserting hole, and can be separated from the inserting hole. The first and second fixed bars 110 and 112, the support bars 114, the guide bar 116, the first and second auxiliary support bars 118 and 120, and the supporting means 122 combine to form the support unit 128.

An exemplary setting process of the support unit 128 for the multi-model type display substrate such as an LCD panel in an LCD cell process according to the present invention will be explained referring to FIGS. 4 and 5.

In FIGS. 4 and 5, a display substrate 200 includes a plurality of first cells 202 having a first active area AA1 in first and second rows, a plurality of second cells 204 having a second active area AA2 smaller than the first active area AA1 and located in a third area, and a dummy region DR defined between the first and second cells 202 and 204.

To support the display substrate 200, a support unit 128 is prepared. Next, the display substrate 200 is disposed on the support unit 128. The plurality of support bars 114 and the guide bar 116 are moved to align to a portion of the dummy region DR between the plurality of the first cells 202. Then, the first and second auxiliary support bars 118 and 120 are moved to align with a portion of the dummy region DR between the plurality of the second cells 204. At this point, if the distance between the guide bar 116 and the first fixed bar 110 is changed due to a required shifting of the guide bar 116 in order to align with the dummy region, the first and second auxiliary support bars 118 and 120 may be exchanged with other auxiliary support bars having a length corresponding to the required distance.

The supporting means 122 overlapped with the active areas AA1 and AA2 may be separated from the support unit 128 before the step of inspecting the display substrate 200. After doing so, the remaining supporting means 122 are located in positions corresponding to the dummy region DR. Accordingly, the supporting means 122 can be located such that they may exclusively contact the dummy region DR. Therefore, shielding of inspection light due to the support bars 114 can be reduced.

If any of the support bars 114 and/or any of the first and second auxiliary support bars 118 and 120 overlap a portion of the small active area due to the alignment structure of the active areas AA1 and AA2, the supporting means 122 that overlap the active areas AA1 and AA2 can be removed from the respective support bar.

With this done, an interval portion IP is defined between the display substrate 200 and the auxiliary support bar 118 (or 120) or between the display substrate 200 and the support bar 114. Inspection light can be partially radiated onto the display substrate 200 due to the interval portion IP. As a result, accuracy of the visual inspection can be enhanced.

Although not shown, the visual inspecting process may include radiating inspection light onto the back of the display substrate and visually inspecting the display substrate, although other inspection methods, optical or otherwise, may be used with the support unit 128 in accordance with the present invention.

As explained above, when the support unit 128 according to the present invention is utilized for a display substrate having various size cells, it can support the display substrate in the dummy region DR through its the support bars. Therefore, production quality can be increased by minimizing shielding of the inspection light.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of inspecting a display substrate using a support unit, the display substrate having a plurality of first cells having a first active area, at least one first dummy region between the first cells, a plurality of second cells having a second active area smaller than the first active area, a second dummy region between the first and second cells, and a plurality of third dummy regions between the second cells; the support unit having a support bar, a guide bar disposed on the support bar, a first and second auxiliary support bar connected to the guide bar, and supporting means disposed on the support bar and the first and second auxiliary support bar, the method comprising:

disposing the display substrate on a plurality of supporting means;

aligning the support bar with one of the at least one first dummy region;

aligning the guide bar with the second dummy region; and aligning the first and second auxiliary support bar with two of the plurality of third dummy regions, wherein the supporting means are located to exclusively contact at least one of the at least one first dummy region, the second dummy region and the plurality of third dummy regions.

2. The method of claim 1, further comprising removing supporting means within the plurality of supporting means that overlap one of the plurality of second cells.

3. The method of claim 2, further comprising radiating inspection light onto the display substrate.

4. The method of claim 3, further comprising visually inspecting the display substrate.

5. The method of claim 3, further comprising removing supporting means within the plurality of supporting means that overlap one of the plurality of second cells.

6. A method of preparing a display substrate for visual inspection on a support unit, the display substrate having a plurality of first cells having a first active area, at least one first dummy region between the first cells, a plurality of second cells having a second active area smaller than the first active area, a second dummy region between the first and second cells, and a plurality of third dummy regions between the second cells; the support unit having a support bar, a guide bar disposed on the support bar, a first and second auxiliary support bar connected to the guide bar, and supporting means disposed on the support bar and the first and second auxiliary support bar, the method comprising:

disposing the display substrate on a plurality of supporting means;

aligning the support bar with one of the at least one first dummy region;

aligning the guide bar with the second dummy region; and aligning the first and second auxiliary support bar with two of the plurality of third dummy regions, wherein the supporting means are located to exclusively contact at least one of the at least one first dummy region, the second dummy region and the plurality of third dummy regions.

\* \* \* \* \*